Patented Mar. 13, 1928.

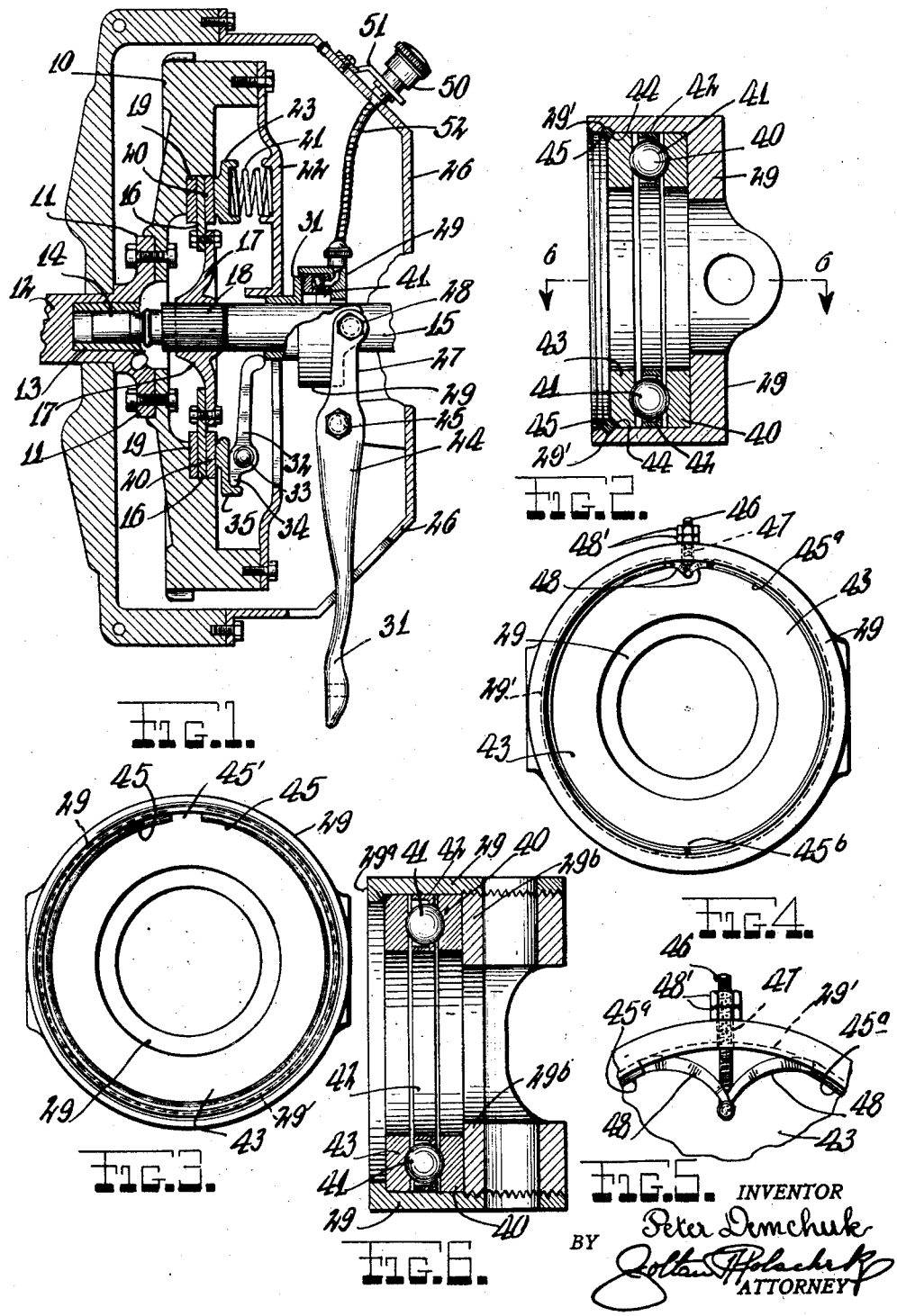

1,662,601

UNITED STATES PATENT OFFICE.

PETER DEMCHUK, OF BROOKLYN, NEW YORK.

CLUTCH BEARING FOR VEHICLES.

Application filed April 21, 1927. Serial No. 185,480.

This application is for similar subject matter as my application, Serial No. 177,433, filed March 22, 1927, for Clutch bearing for vehicles.

This invention relates to a new and useful device in the nature of a clutch release bearing particularly adapted for use in connection with motor vehicle clutches for the purpose of providing a clutch release bearing which will permit the clutch to be disengaged without difficulty.

The object of the invention is to provide a clutch release bearing of novel construction and arrangement of parts.

A further object of the invention is to provide a novel means of retaining the clutch release bearing in the clutch release collar.

The above, and other objects are hereinafter more fully described, claimed, and illustrated in the accompanying drawing.

Fig. 1 is a vertical sectional view of a motor vehicle clutch embodying my improved clutch release bearing.

Fig. 2 is an enlarged detail sectional view of my improved clutch release bearing, illustrating in particular the method of retaining same in the clutch release collar.

Fig. 3 is a front view thereof.

Fig. 4 is a view similar to Fig. 3, but illustrating a modification of the invention.

Fig. 5 is an enlarged fragmentary view of Fig. 4.

Fig. 6 is a sectional view of a modified form of the invention, viewed as though taken on the line 6—6 of Fig. 2.

The fly wheel 10 is attached to the flanged portion 11 of the crankshaft 12 which is provided with an axial aperture adapted to support the pilot bearing 13, and to receive the forward portion 14 of the clutch shaft 15, so as to support the clutch shaft 15. The driving disc 16 is attached to the clutch hub 17, slidably mounted on the clutch shaft 15. The clutch shaft 15 is serrated or splined, as at 18, adapted to engage in similar serrations formed in the axial aperture of the clutch hub 17, so as to permit the clutch hub 17 to rotate or drive the clutch shaft 15. The clutch friction rings 19 and 20 are positioned in contact with, and at each side of the driving disc 16, and are provided with serrated outer peripheries, adapted to engage in the serrated recess 20 formed in the fly wheel 10. The expansion springs 21 are positioned intermediate the clutch cover 22, and the clutch plate 23, so as to normally hold the driving disc 16 and the clutch friction rings 19 and 20 in contact, so as to permit the fly wheel 10 when rotated to rotate the clutch shaft 15.

The clutch fork 24 is pivoted intermediately as at 25, to the transmission support 26. The clutch fork 24 is provided with a forked portion 27 pivotally attached as at 28 to both sides of the clutch release collar 29. The clutch release collar 29 is of ring shaped construction, positioned over, or around the clutch shaft 15. The thrust bearing 30 is mounted in the clutch collar 29. The above described construction is common to motor vehicle clutches in general, and is such as will permit the extended extremity 31, of the clutch fork 24, when pulled or forced outwardly, to permit the clutch release bearing 30 to engage the release collar 31, slidably mounted on the clutch shaft 15, so as to allow the release collar 31 to engage the release levers 32, pivotally attached, as at 33, to the fly wheel 10. The extended portions 34 of the release levers 32 engage in extended portions 35 of the clutch plate 23, so as to release the springs 21 which will allow the driving disc 16 and the clutch plates 19 and 20 to be disengaged, causing the clutch shaft 15 to stop rotating, as is necessary to permit the gears of the transmission to be shifted.

It should be understood that I do not claim the above described construction, same being explanatory to more precisely and intelligently understand my invention.

As here embodied my improved clutch release bearing comprises an inner ball race 40, frictionally mounted in a recess formed in the clutch collar 20. The inner ball race 40 is provided with a co-axial groove adapted to receive the ball bearings 41, held in the desired relative position by the usual retainer 42. The outer ball race 43 is provided with a co-axial groove adapted to receive the ball bearings 41. The outer ball race 43 is provided with an outer tapered edge 44. A retaining ring 45 of spring steel, is split as at 45', and is engaged in a circular groove 29' formed in the clutch collar 29, and this retaining ring is abuttable against the tapered edge 44, securely, and rotatably holding the outer ball race 43 in position.

Referring in particular to Figs. 4 and 5 of the drawing, a modification has been illustrated disclosing a retaining ring 45ª split at 45ᵇ and 45ᶜ. A rod 46 extends through an aperture 47 in the clutch collar 29, and the lower end of the said rod projects within split 45ᶜ. Cam shaped levers 48 are pivotally mounted at their lower ends to the lower end of rod 46, and the upper portions of the cam shaped levers 48 abut against the groove 29′ while the ends abut against the ends of ring 45ª forming the split. The top of the rod 46 is threadedly engaged by nuts 48′. The turning of nuts 48′ causes the rod 46 to move upwards, forcing the levers 48 against the ends of the split 45ᶜ rigidly holding ring 45ª in place.

The modification illustrated in Fig. 6 discloses a rim 29ª from the clutch collar 29, holding the outer race 43 in place, while the clutch collar 29 is formed with a plug portion 29ᵇ adapted to hold the inner race 40 in place.

I have also provided a grease cup 50, secured to the bracket 51, attached to the transmission support 26. The flexible member 52 is attached to the grease cup 50 and to the clutch collar 29, as a means of lubricating the ball bearing 40.

While I have illustrated and described the preferred form, construction, and arrangement of the several elements employed, it will be understood that the device is nevertheless, susceptible of considerable modification therein, and I therefore reserve the right and privilege of resorting to all such changes as may be fairly embodied within the spirit and scope of the invention as claimed.

Having thus described my invention what I claim as new and desire to secure by United States Letters Patent is:

1. In a device of the class described, the combination with a clutch release bearing, of a clutch release collar holding the bearing, and formed with a circular groove, a split retaining ring engaged in the groove and adapted to hold the bearing in place, and adjustable means comprising cam levers supported by said collar and disposed in the split of said retaining ring adapted to spread the end portions thereof for securing the ring against displacement.

2. In a device of the class described, the combination with a clutch release bearing, of a clutch release collar holding the bearing, and formed with a circular groove, a split retaining ring engaged in the groove and adapted to hold the bearing in place, a rod extending through the collar, the lower end thereof projecting within a split of the split retaining ring, cam shaped levers pivotally mounted at their lower ends to the lower end of the rod, the upper portions of the cam shaped levers, abutting against the said groove, and the ends against the ends of the retaining ring forming the said split, and nuts threadedly engaged on the top end of the rod, adapted upon being turned to move the rod upwards, forcing the levers against the ends of the split, thus rigidly holding the ring in place.

3. In a device of the class described, a collar having a circumferential groove in the inner periphery thereof and an aperture communicative with said groove bearing members disposed within said collar, a retaining member mounted in said groove for retaining said bearing member in said collar comprising ring sections, a bolt disposed through said aperture and extending between adjacent ends of said ring sections, levers pivotally mounted on the inner end of said bolt and engaged against one pair of adjacent extremities of said ring sections, and means comprising a nut threaded on said bolt adapted to be tightened for rotating said levers to spread said ring section for holding the same in said groove.

4. In a device of the class described, a collar having a circumferential groove in the inner periphery thereof and an aperture communicative with said groove bearing members disposed within said collar, a retaining member mounted in said groove for retaining said bearing member in said collar comprising ring sections, and adjustable means for securing said ring sections against displacement comprising levers pivotally mounted within said collar and disposed between two adjacent ends of said ring sections for urging said ends apart.

In testimony whereof I have affixed my signature.

PETER DEMCHUK